(12) United States Patent
Mohlin et al.

(10) Patent No.: US 10,996,751 B2
(45) Date of Patent: May 4, 2021

(54) TRAINING OF A GAZE TRACKING MODEL

(71) Applicant: Tobii AB, Danderyd (SE)

(72) Inventors: David Mohlin, Danderyd (SE); Erik Lindén, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/715,219

(22) Filed: Dec. 16, 2019

(65) Prior Publication Data

US 2020/0225745 A1 Jul. 16, 2020

(30) Foreign Application Priority Data

Dec. 21, 2018 (SE) ..................... 1851661-7

(51) Int. Cl.
| | |
|---|---|
| *G06F 3/01* | (2006.01) |
| *G06K 9/00* | (2006.01) |
| *G06T 7/20* | (2017.01) |
| *G06T 1/00* | (2006.01) |

(52) U.S. Cl.
CPC ......... *G06F 3/013* (2013.01); *G06K 9/00604* (2013.01); *G06T 1/0007* (2013.01); *G06T 7/20* (2013.01); *G06T 2207/20081* (2013.01); *G06T 2207/30201* (2013.01)

(58) Field of Classification Search
CPC ... G06F 3/013; G06K 9/00604; G06T 1/0007; G06T 7/20; G06T 2207/20081; G06T 2207/30201
See application file for complete search history.

(56) References Cited

U.S. PATENT DOCUMENTS

| | | | |
|---|---|---|---|
| 10,061,383 B1* | 8/2018 | Ludusan | G06F 1/1686 |
| 10,496,166 B2* | 12/2019 | Kimura | A61B 3/0041 |
| 2016/0063303 A1* | 3/2016 | Cheung | G06K 9/00248 |
| | | | 382/103 |
| 2018/0308252 A1* | 10/2018 | Alonso | G06F 3/013 |

* cited by examiner

*Primary Examiner* — Nelson M Rosario
(74) *Attorney, Agent, or Firm* — Samuel I. Yamron (57) ABSTRACT

A gaze tracking model is adapted to predict a gaze ray using an image of the eye. The model is trained using training data which comprises a first image of an eye, reference gaze data indicating a gaze point towards which the eye was gazing when the first image was captured, and images of an eye captured by first and second cameras at a point in time. The training comprises forming a distance between the gaze point and a gaze ray predicted by the model using the first image, forming a consistency measure based on a gaze ray predicted by the model using the image captured by the first camera and a gaze ray predicted by the model using the image captured by the second camera, forming an objective function based on at least the formed distance and the consistency measure, and training the model using the objective function.

20 Claims, 7 Drawing Sheets

TRAINING OF A GAZE TRACKING MODEL

CROSS-REFERENCES TO RELATED APPLICATIONS

This application claims priority to Swedish Application No. 1851661-7, filed Dec. 21, 2018; the content of which are hereby incorporated by reference.

TECHNICAL FIELD

The present disclosure generally relates to gaze tracking.

BACKGROUND

Different techniques have been developed for monitoring in which direction (or at which point on a display) a user is looking. This is often referred to as gaze tracking or eye tracking. Such techniques often involve detection of certain features in images of the eye, and a gaze direction or gaze point is then computed based on positions of these detected features. An example of such a gaze tracking technique is pupil center corneal reflection (PCCR). PCCR-based gaze tracking employs the position of the pupil center and the position of glints (reflections of illuminators at the cornea) to compute a gaze direction of the eye or a gaze point at a display.

As an alternative (or complement) to conventional techniques such as PCCR-based gaze tracking, machine learning may be employed to train an algorithm to perform gaze tracking. More specifically, the machine learning employs training data in the form of images of the eye and associated known gaze points to train the algorithm, so that the trained algorithm can perform gaze tracking in real time based on images of the eye. Plenty of training data is typically needed for such machine learning to work properly. The training data may take quite some time and/or resources to collect. In many cases, certain requirements may be put on the training data. The training data should for example preferably reflect all those types of cases/scenarios that the gaze tracking algorithm is supposed to be able to handle. If only certain types of cases/scenarios are represented in the training data (for example only small gaze angles, or only well-illuminated images), then the gaze tracking algorithm may perform well for such cases/scenarios, but may not perform that well for other cases/scenarios not dealt with during the training phase.

It would be desirable to provide new ways to address one or more of the abovementioned issues.

SUMMARY

Methods, systems and computer-readable storage media having the features defined in the independent claims are provided for addressing one or more of the abovementioned issues. Preferable embodiments are defined in the dependent claims.

Hence, a first aspect provides embodiments of a gaze tracking method. The method comprises obtaining training data. The training data comprises a first image of an eye captured by an imaging device, reference gaze data indicating a gaze point towards which the eye was gazing when the first image was captured, and images of an eye captured at a point in time (or at a time instance) by first and second imaging devices, respectively. The method comprises training a gaze tracking model using the training data. The gaze tracking model is adapted to predict a gaze ray of an eye using an image of that eye captured by an imaging device. The training comprises forming a distance between the gaze point and a gaze ray predicted by the gaze tracking model using the first image, forming a consistency measure based on at least a gaze ray predicted by the gaze tracking model using the image captured at the point in time (or at the time instance) by the first imaging device and a gaze ray predicted by the gaze tracking model using the image captured at the point in time (or at the time instance) by the second imaging device, forming an objective function based on at least the formed distance and the consistency measure, and training the gaze tracking model using the objective function.

Training data including images of an eye and associated true gaze points may be relatively easy to generate, for example by asking a user to look at certain stimulus points while capturing images of the user's eyes. However, it may be difficult to predict gaze rays only based on such training data. Indeed, a predicted gaze ray may differ significantly from the true gaze ray, even if the predicted gaze ray hits the true gaze point. Training data including true gaze rays may be rather difficult to generate, since the true position of the gaze origin is typically unknown even if the true gaze point is known. The consistency measure employed in the proposed gaze tracking method allows the training of the gaze tracking model to employ not only a comparison between a known gaze point and a predicted gaze ray, but also a comparison between gaze rays predicted by the gaze tracking model for images captured by different imaging devices. This is a way to measure whether the predicted gaze rays seem to be realistic, without actually needing to know the true gaze ray or the true gaze origin.

It will be appreciated that the imaging device by which the first image was captured need not necessarily be the first imaging device or the second imaging device. A third imaging device may for example be employed to capture the first image.

It will also be appreciated that the first image need not necessarily be captured at the same point in time (or at the same time instance) as when the images were captured by the first and second imaging devices. The first image may for example be captured at a different point in time, for example at a completely different occasion.

It will also be appreciated that the images captured at the point in time need not necessarily comprise more than one image captured by the first imaging device and one image captured by the second imaging device. However, in some embodiments, the training data may include multiple images captured by the first imaging device and/or multiple images captured by the second imaging device.

Further, it will be appreciated that the objective function may for example be a cost function or a loss function.

A second aspect provides embodiments of a gaze tracking system comprising processing circuitry (or one or more processors) configured to obtain training data. The training data comprises a first image of an eye captured by an imaging device, reference gaze data indicating a gaze point towards which the eye was gazing when the first image was captured, and images of an eye captured at a point in time by first and second imaging devices, respectively. The processing circuitry (or one or more processors) is configured to train a gaze tracking model using the training data. The gaze tracking model is adapted to predict a gaze ray of an eye using an image of that eye captured by an imaging device. The processing circuitry is configured to train the gaze tracking model by at least forming a distance between the gaze point and a gaze ray predicted by the gaze tracking model using the first image, form a consistency measure based on at least a gaze ray predicted by the gaze tracking model using the image captured at the point in time by the first imaging device and a gaze ray predicted by the gaze tracking model using the image captured at the point in time by the second imaging device, forming an objective function based on at least the formed distance and the consistency measure, and training the gaze tracking model using the objective function.

The processing circuitry (or one or more processors) may for example be configured to perform the method as defined in any of the embodiments of the first aspect disclosed herein (in other words, in the claims, the summary, or the detailed description). The gaze tracking system may for example comprise one or more non-transitory computer-readable storage media (or one or more memories) storing instructions that, upon execution by the processing circuitry (or one or more processors), cause the gaze tracking system to perform the method as defined in any of the embodiments of the first aspect disclosed herein.

The effects and/or advantages presented in the present disclosure for embodiments of the method according to the first aspect may also apply to corresponding embodiments of the system according to the second aspect.

A third aspect provides embodiments of a non-transitory computer-readable storage medium storing instructions which, when executed by a gaze tracking system, cause the gaze tracking system to obtain training data and to train a gaze tracking model using the training data. The training data comprises a first image of an eye captured by an imaging device, reference gaze data indicating a gaze point towards which the eye was gazing when the first image was captured, and images of an eye captured at a point in time by first and second imaging devices, respectively. The gaze tracking model is adapted to predict a gaze ray of an eye using an image of that eye captured by an imaging device. The training comprises forming a distance between the gaze point and a gaze ray predicted by the gaze tracking model using the first image, forming a consistency measure based on at least a gaze ray predicted by the gaze tracking model using the image captured at the point in time by the first imaging device and a gaze ray predicted by the gaze tracking model using the image captured at the point in time by the second imaging device, forming an objective function based on at least the formed distance and the consistency measure, and training the gaze tracking model using the objective function.

The non-transitory computer-readable storage medium may for example store instructions which, when executed by a gaze tracking system (or by processing circuitry comprised in the gaze tracking system), cause the gaze tracking system to perform the method as defined in any of the embodiments of the first aspect disclosed herein (in other words, in the claims, the summary, or the detailed description).

The non-transitory computer-readable storage medium may for example be provided in a computer program product. In other words, a computer program product may for example comprise a non-transitory computer-readable storage medium storing instructions which, when executed by a gaze tracking system, cause the gaze tracking system to perform the method as defined in any of the embodiments of the first aspect disclosed herein.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In what follows, example embodiments will be described in greater detail with reference to the accompanying drawings, on which.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Throughout the present disclosure, the term imaging device relates to a device which is adapted to capture images. An imaging device may for example be a camera or an image sensor.

Gaze tracking methods as well as corresponding systems and storage media will be described below with reference to FIGS. 3-9. First, certain features of an eye will be described with reference to FIGS. 1-2.

Figure 1:
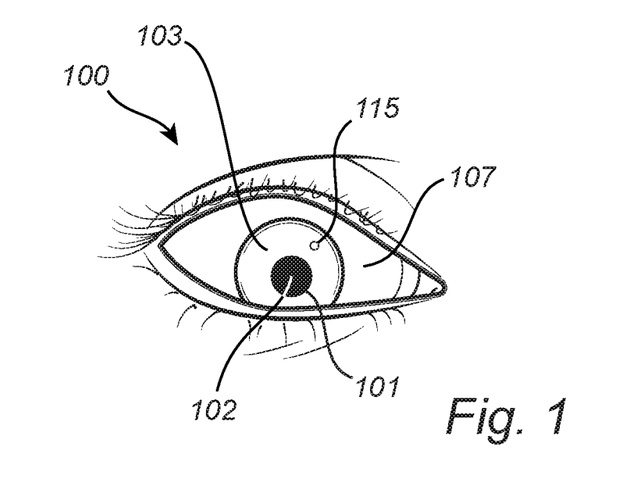
FIG. 1 is a front view of an eye.
Figure 2:
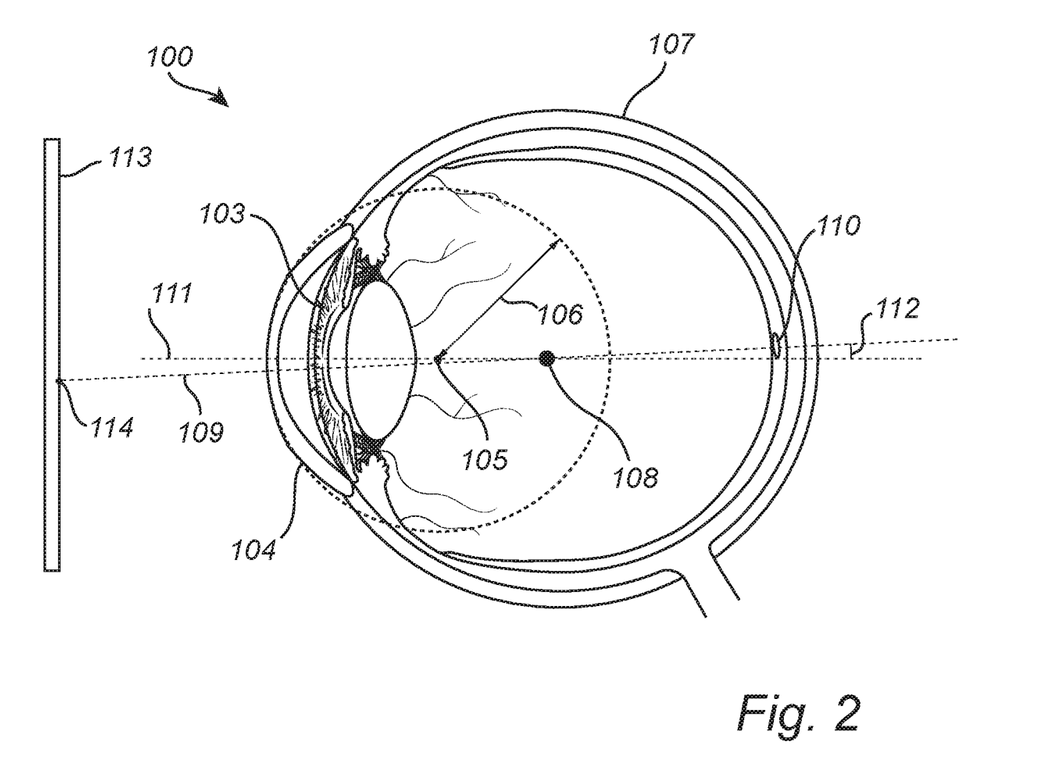
FIG. 2 is a cross sectional view of the eye from FIG. 1 from the side of the eye.

FIG. 1 is a front view of an eye 100. FIG. 2 is a cross sectional view of the eye 100 from the side of the eye 100. While FIG. 2 shows more or less the entire eye 100, the front view presented in FIG. 1 only shows those parts of the eye 100 which are typically visible from in front of a person's face. The eye 100 has a pupil 101, which has a pupil center 102. The eye 100 also has an iris 103 and a cornea 104. The cornea 104 is located in front of the pupil 101 and the iris 103. The cornea 104 is curved and has a center of curvature 105 which is referred to as the center 105 of corneal curvature, or simply the cornea center 105. The cornea 104 has a radius of curvature referred to as the radius 106 of the cornea 104, or simply the cornea radius 106. The eye 100 also has a sclera 107. The eye 100 has a center 108 which may also be referred to as the center 108 of the eye ball, or simply the eye ball center 108. The visual axis 109 of the eye 100 passes through the center 108 of the eye 100 to the fovea 110 of the eye 100. The optical axis 111 of the eye 100 passes through the pupil center 102 and the center 108 of the eye 100. The visual axis 109 forms an angle 112 relative to the optical axis 111. The deviation or offset between the visual axis 109 and the optical axis 111 is often referred to as the fovea offset 112. In the example shown in FIG. 2, the eye 100 is looking towards a display 113, and the eye 100 is gazing at a gaze point 114 at the display 113. FIG. 1 also shows a reflection 115 of an illuminator at the cornea 104. Such a reflection 115 is also known as a glint 115.

Figure 3:
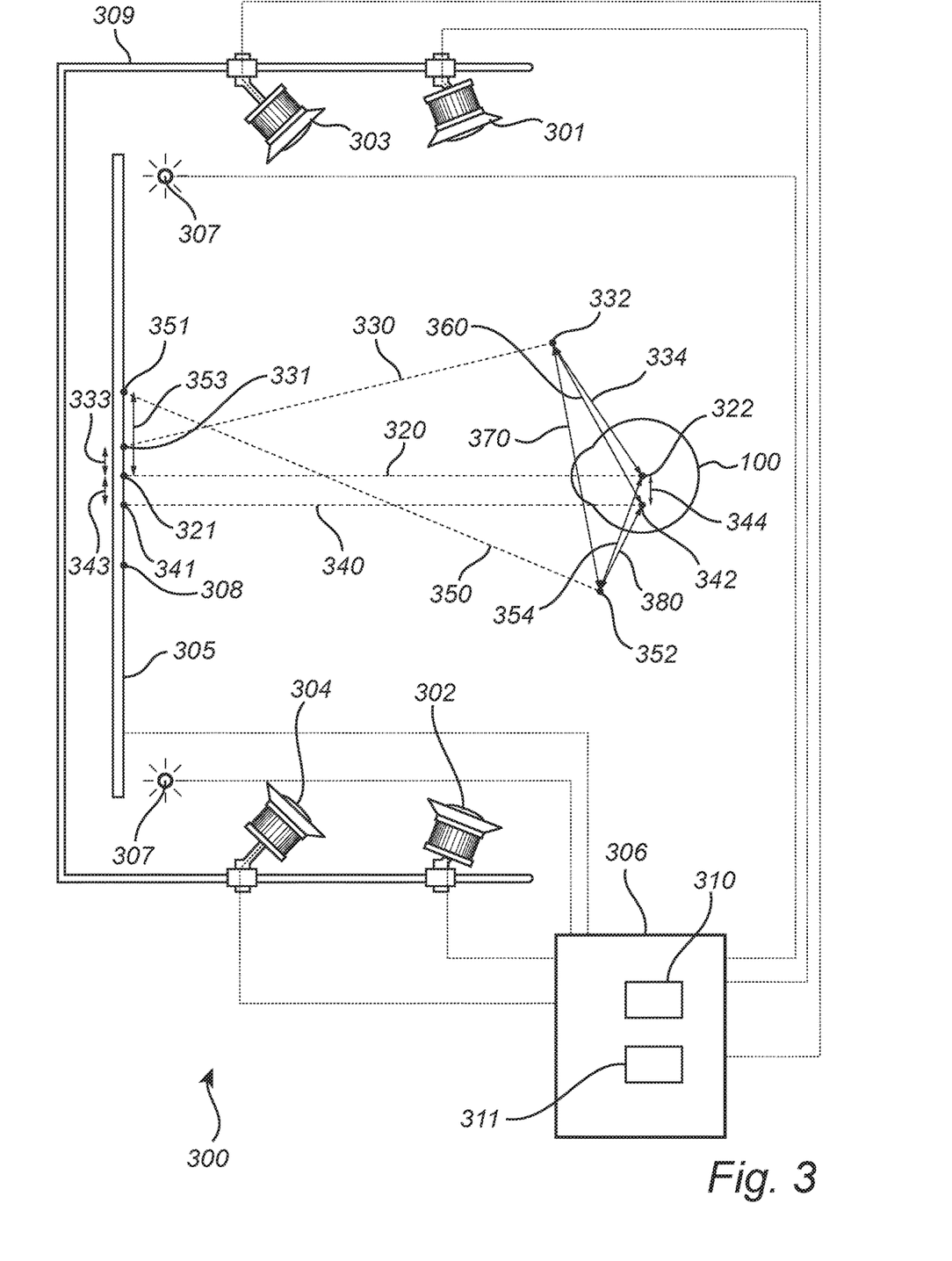
FIG. 3 is a schematic overview of a gaze tracking system, according to an embodiment.

FIG. 3 is a schematic overview of a gaze tracking system 300, according to an embodiment. The system 300 comprises imaging devices 301-304 (for example cameras or image sensors) for capturing images of the eye 100 while the eye 100 looks at a display 305 (which may for example be the display 113 shown in FIG. 2). The system 300 also comprises processing circuitry 306 configured to perform a gaze tracking method, according to an embodiment. Gaze tracking methods will be described further below with reference to FIGS. 6-7.

The system 300 may optionally comprise one or more illuminators 307 (or light sources) for illuminating the eye 100. One or more illuminators 307 may for example be arranged to provide glints at the cornea 104 of the eye 100 for use in gaze tracking. Illuminator(s) 307 arranged to provide glints may for example be arranged at known (or fixed) position(s) relative to the imaging devices 301-304 and/or relative to the display 305, so that the positions of the glints provide information about the position of the eye 100 in space. One or more illuminators 307 may for example be arranged to increase the contrast between the pupil 101 and the iris 103 of the eye 100 in images captured by one or more of the imaging devices 301-304. The illuminator(s) 307 may for example be infrared or near infrared illuminators, for example in the form of light emitting diodes (LEDs). However, other types of illuminators may also be envisaged. FIG. 3 shows example illuminators 307 located at either side of the display 305, but the illuminators 307 could be located elsewhere. The system 300 may for example comprise illuminators 307 distributed around the display 305.

The processing circuitry 306 is communicatively connected to the imaging devices 301-304, for example via a wired or wireless connection. The processing circuitry 306 may also be communicatively connected to the display 305, for example for controlling (or triggering) the display 305 to show test stimulus points 308 for calibration of the gaze tracking system 300. The processing circuitry 306 may also be communicatively connected to the illuminator(s) 307, for example for controlling the illuminator(s) 307 to be synchronized with the capturing of images by the imaging devices 301-304 and/or to be synchronized with image processing performed by the processing circuitry 306.

The imaging devices 301-304 are arranged at known positions relative to each other and relative to the display 305. The imaging devices 301-304 may for example be mounted at a holding arrangement 309 (such as a rig or rack) for holding the imagining devices 301-304 in position. The imaging devices 301-304 are calibrated so that the transfer function from 3D space to 2D image space is known for each imaging device 301-304.

The imaging devices 301-304 may for example be cameras or image sensors. The imaging devices 301-304 may for example be charged-coupled device (CCD) cameras or Complementary Metal Oxide Semiconductor (CMOS) cameras. However, other types of cameras may also be envisaged. FIG. 3 shows example imaging devices 301-304 located at respective sides of the display 305, but the imaging devices 301-304 could be located elsewhere, for example below the display 305. The system 300 may for example comprise imaging devices distributed around the display 305.

The display 305 may for example be a liquid-crystal display (LCD) or a LED display. However, other types of displays may also be envisaged. The display 305 may for example be flat or curved. The display 305 may for example be a TV screen, a computer screen, or may be part of a head-mounted device such as a virtual reality (VR) or augmented reality (AR) device. The display 305 may for example be placed in front of one of the user's eyes. In other words, separate displays 305 may be employed for the left and right eyes. Separate gaze tracking equipment (such as imaging devices 301-304 and/or illuminators 307) may for example be employed for the left and right eyes.

The processing circuitry 306 may be employed for gaze tracking for both eyes, or there may be separate processing circuitry 306 for the left and right eyes. The gaze tracking system 300 may for example perform gaze tracking for the left and right eyes separately, and may then determine a combined gaze point as an average of the gaze points for the left and right eyes.

The processing circuitry 306 may for example comprise one or more processors 310. The processor(s) 310 may for example be application-specific integrated circuits (ASIC) configured to perform a specific gaze tracking method. Alternatively, the processor(s) 310 may configured to execute instructions (for example in the form of a computer program) stored in one or more memories 311. Such a memory 311 may for example be comprised in the circuitry 306 of the gaze tracking system 300, or may be external to (for example located remotely from) the gaze tracking system 300. The memory 311 may store instructions for causing the gaze tracking system 300 to perform a gaze tracking method.

It will be appreciated that the gaze tracking system 300 described above with reference to FIG. 3 is provided as an example, and that many other gaze tracking systems may be envisaged. For example, the imaging devices 301-304 and/or the illuminator(s) 307 need not necessarily be regarded as part of the gaze tracking system 300. The gaze tracking system 300 may for example consist only of the processing circuitry 306. The display 305 may for example be comprised in the gaze tracking system 300, or may be regarded as separate from the gaze tracking system 300.

Figure 4:
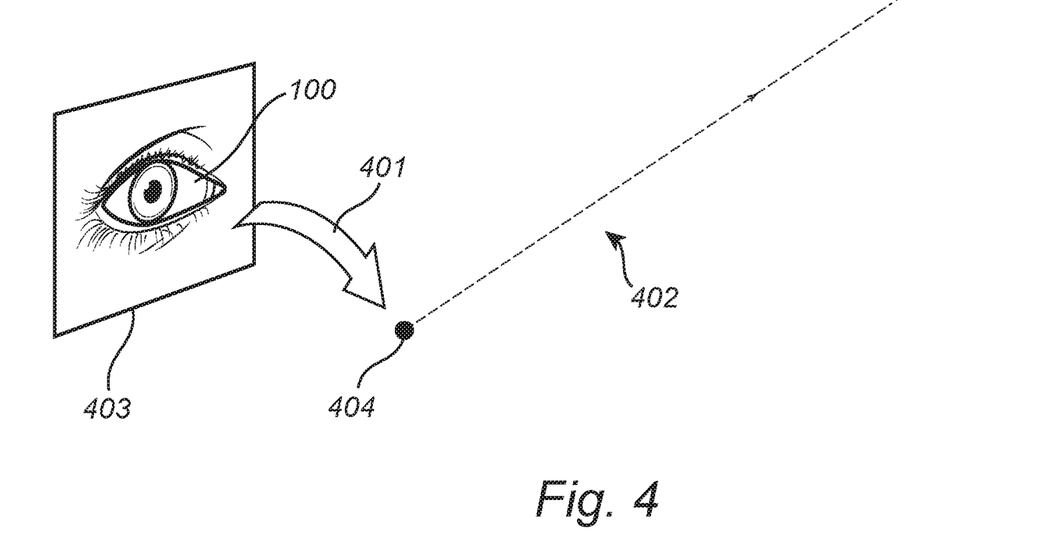
FIG. 4 illustrates a gaze tracking model which may be trained by the gaze tracking system in FIG. 3.

FIG. 4 illustrates a gaze tracking model 401 which may be trained by the gaze tracking system 300 described above with reference to FIG. 3. The gaze tracking model 401 is adapted to predict or estimate a gaze ray 402 of an eye 100 in 3D space using a 2D image 403 of the eye 100 captured by an imaging device. The gaze ray 402 has a gaze origin 404. The gaze tracking model 401 may be regarded as a mapping or function which receives an image 403 as input, and provides a gaze ray 402 as output.

The gaze tracking model 401 described above with reference to FIG. 4 may for example be a machine learning model. The gaze tracking model 401 may for example be based on a neural network.

Figure 5:
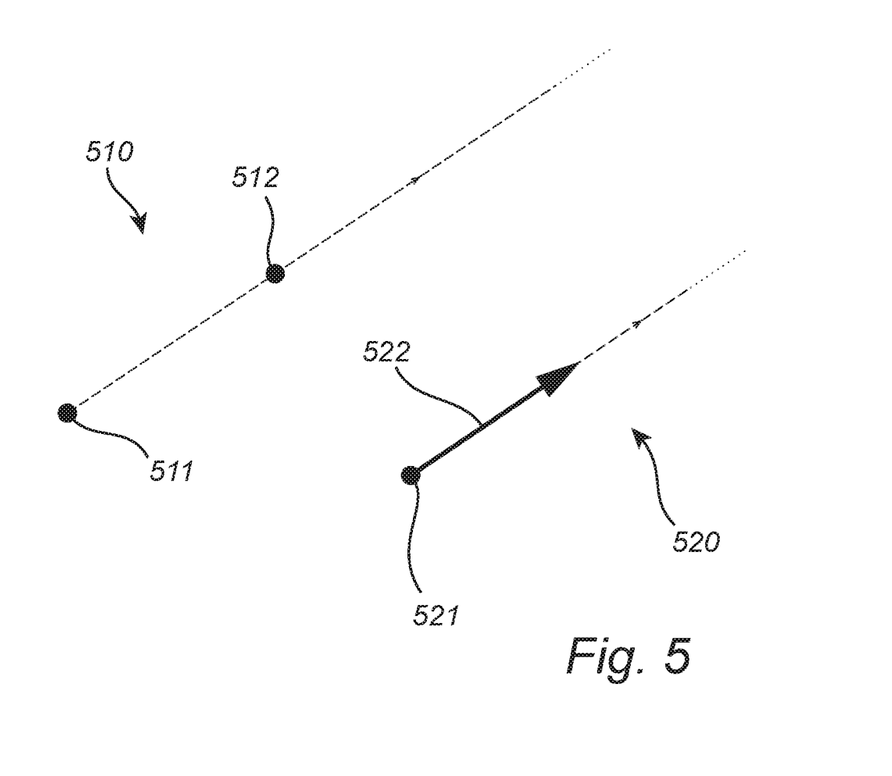
FIG. 5 illustrates different ways of defining a gaze ray.

FIG. 5 illustrates different ways of defining a gaze ray. A first example gaze ray 510 begins at a first point 511 in 3D space and passes through a second point 512 in 3D space. The first gaze ray 510 may be defined via the first point 511 and the second point 512. The first point 511 may be referred to as the gaze origin of the first gaze ray 510. A second example gaze ray 520 begins at a third point 521 in 3D space and is directed along a vector 522 which defines the direction of the second gaze ray 520 in 3D space. The second gaze ray 520 may be defined via the third point 521 and the vector 522. The third point 521 may be referred to as the gaze origin of the second gaze ray 520. The gaze mapping 401 described above with reference to FIG. 4 may for example predict the gaze ray 402 in the form of two points along the gaze ray (such as the first point 511 and the second point 521 along the first gaze ray 510), or a point along the gaze ray and a direction of the gaze ray (such as the third point 521 and the vector 522 along the second gaze ray 520).

The gaze tracking model 401 described above with reference to FIG. 4 may be employed to predict gaze rays based on images captured by the imaging devices 301-304 in the system 300 described above with reference to FIG. 3. In the example shown in FIG. 3, the center 108 of the eye 100 is located at a position 322 in space, and is looking at a gaze point 321 at the display 305. Hence, the true gaze ray 320 is directed from the position 322 of the eye 100 to the true gaze point 321. In the present example, the gaze tracking model 401 predicts a first gaze ray 330 based on an image captured by the imaging device 301, a second gaze ray 340 based on an image captured by the imaging device 302, and a third gaze ray 350 based on an image captured by the imaging device 303. Images captured by the imaging device 304 could also be demployed, but in the present example, the imaging device 304 is not employed.

As shown in FIG. 3, the first gaze ray 330 reaches the display 305 at a point 331 at a short distance 333 from the true gaze point 321, but starts at a predicted gaze origin 332 outside the eye 100 at a relatively long distance 334 from the true gaze origin 322. Hence, the first gaze ray 330 is quite different from the true gaze ray 320, despite the fact that the estimated gaze point 331 is rather close to the true gaze point 321. As shown in FIG. 3, the second gaze ray 340 reaches the display 305 at a point 341 which is located a relatively short distance 343 from the true gaze point 321. The second gaze ray 340 starts at a predicted gaze origin 342 at a relatively short distance 344 from the true gaze origin 322. The direction of the second gaze ray 340 is quite similar to the direction of the true gaze ray 320, but the second gaze ray 340 is located at a slightly incorrect position in space compared to the true gaze ray 320. As shown in FIG. 3, the third gaze ray 350 reaches the display 305 at a point 351 at a relatively long distance 353 from the true gaze point 321, and begins at a predicted gaze origin 352 outside the eye 100 at a relatively long distance 354 from the true gaze origin 322. Hence, the third gaze ray 350 is quite different from the true gaze ray 320.

As shown in FIG. 3, the first gaze ray 330 does provide a relatively good estimated gaze point 331, but is quite different from the true gaze ray 320. In particular, it has an unrealistic gaze origin 332. The second gaze ray 340, on the other hand, is quite similar to the true gaze ray 320. Accuracy of the gaze rays predicted by the gaze tracking model 401 may be improved via training of the gaze tracking model 401. During training, it would be desirable to promote gaze rays like the second gaze ray 340 over gaze rays like the first gaze ray 330. However, training data employed for training gaze tracking models usually only include known gaze points and images of the eye captured while the eye was gazing at the known gaze points. The true gaze origin and the true gaze ray are typically unknown, so traditionally such data cannot be employed during training of the gaze tracking model 401. Hence, it may be difficult to teach a gaze tracking model to output gaze rays like the second gaze ray 340 instead of gaze rays like the first gaze ray 330 (for which the gaze origin 332 is completely unrealistic).

The inventors have realized that stereo consistency may be employed during the training of the gaze tracking model, 401. More specifically, as long as the relative positions and orientations of the imaging devices 301-304 are taken into account, then a good gaze tracking model 401 should predict a similar gaze ray for an image captured by the imaging device 301 as for an image captured at the same time by any of the other imaging devices 302-304. Hence, a comparison between gaze rays predicted for the respective imaging devices 301-304 may be employed during training of the gaze tracking model 401. In this way, the training of the gaze tracking model 401 may be performed, even if true gaze rays and true gaze origin may not be available in the training data. The gaze tracking method described below with reference to FIGS. 6-7 employs a consistency measure which is based on this realization.

Figure 6:
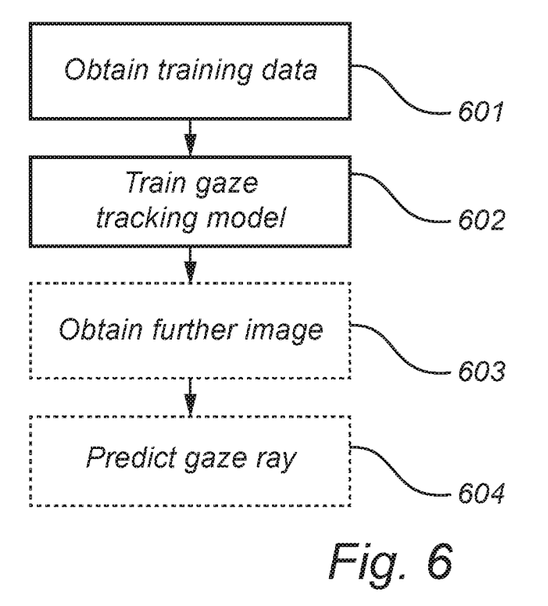
FIG. 6 is a flow chart of a gaze tracking method, according to an embodiment.
Figure 7:
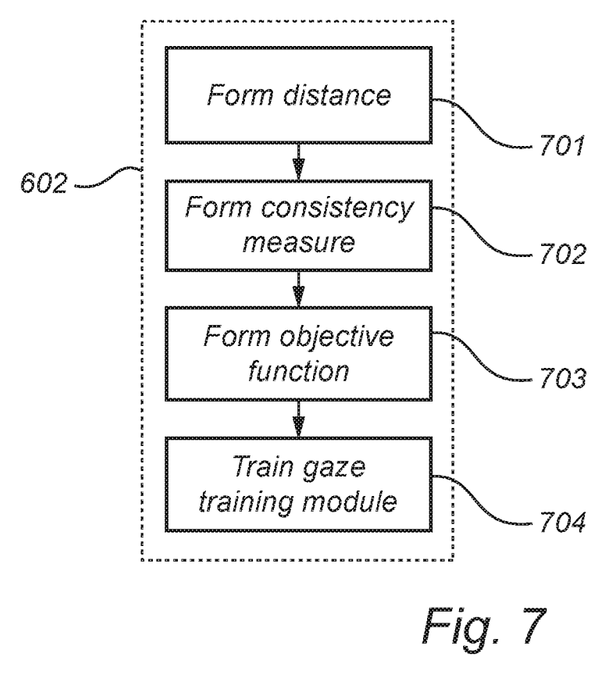
FIG. 7 is a flow chart of how a gaze tracking model is trained in the gaze tracking method in FIG. 6, according to an embodiment.

FIG. 6 is a flow chart of a gaze tracking method 600, according to an embodiment. FIG. 7 is a flow chart of how the gaze tracking model 401 may be trained in the method 600. The method 600 will now be described with reference to FIGS. 3-7.

The gaze tracking method 600 comprises obtaining 601 training data. The training data comprises a first image of an eye 100 captured by an imaging device, reference gaze data indicating a gaze point 321 towards which the eye 100 was gazing when the first image was captured, and images of an eye 100 captured at a point in time by first and second imaging devices, respectively. In other words, the image captured at the point in time by the first imaging device is captured at least approximately simultaneously as the image captured at the point in time by the second imaging device.

In a first example implementation of the step 601, the first image is captured by the imaging device 301, while the images captured by first and second imaging devices at a point in time are captured by the imaging devices 302 and 303. Hence, in the first example implementation, three imaging devices 301-303 are employed to provide the images included in the training data (but it will be appreciated that the training data may for example include further images, captured by the imaging devices 301-303 and/or by other imaging devices 304). The first image may for example be captured at a different point in time (for example on a different day) than the images captured by the imaging devices 302 and 303. Hence, the reference gaze data relating to a gaze point associated with the first image is not necessarily relevant for the point in time when the imaging devices 302 and 303 captured their respective images. In other words, the gaze point for the point in time when the imaging devices 302 and 303 captured their respective images may be unknown.

In a second example implementation of the step 601, the imaging device by which the first image was captured is the first imaging device. In other words, the first image is captured by the imaging device 301, and the images captured by first and second imaging devices at a point in time are captured by the imaging devices 301 and 302. Hence, in the second example implementation, two imaging devices 301-302 are employed to provide the images included in the training data (but it will be appreciated that the training data may for example include further images, captured by the imaging devices 301-302 and/or by other imaging devices 303-304). The first image may for example be captured at a different point in time (for example on a different day) than the other two images captured by the imaging devices 301 and 302.

In a third example implementation of the step 601, the first image is one of the images captured by the first and second imaging devices at the point in time. In other words, the images captured by first and second imaging devices at a point in time are captured by the imaging devices 301 and 302, and the first image coincides with the image captured by the imaging device 301 at the point in time or the image captured by the imaging device 302 at the point in time. Hence, in the third example implementation, two imaging devices 301-302 are employed to provide the images included in the training data (but it will be appreciated that the training data may for example include further images, captured by the imaging devices 301-302 and/or by other imaging devices 303-304).

The images comprised in the training data obtained at step 601 may for example be obtained in the form of snap shots, or as part of video sequences. The images may for example be received from the imaging devices 301-303, either directly from the imaging devices 301-303 or indirectly from the imaging devices 301-303 (for example via one or more other components of the system 300). The training data may for example also include images captured by further imaging devices 304, and/or images captured by the imaging devices 301-303 at other points in time.

The method 600 comprises training 602 a gaze tracking model 401 using the training data. As described above with reference to FIG. 4, the gaze tracking model is adapted to predict a gaze ray 402 of an eye 100 using an image 403 of that eye 100 captured by an imaging device. The training 602 serves to make the gaze tracking model 401 better at predicting gaze rays. As described below, an objective function (which may for example be a cost function) is employed during the training to indicate what is regarded a good performance when predicting gaze rays.

Substeps 701-704 of the training 602 the gaze tracking model 401 will be described below with reference to the first example implementation where three imaging devices 301-303 are employed to capture the images included in the training data. It will be appreciated that the substeps 701-704 could just as well be described with reference to the second or third example implementations described above, where two imaging devices 301-302 are employed to capture the images included in the training data.

The training 602 comprises forming 701 a distance 333 between the gaze point 321 and the gaze ray 330 predicted by the gaze tracking model 401 using the first image. In other words, the distance 333 measures how far the gaze point 321 is from the predicted gaze ray 330. The distance 333 may for example be measured between the point along the gaze ray 330 which is closest to the gaze point 321. In other words, the distance 333 may for example be measured as the minimum distance between the gaze ray 330 and the gaze point 321. If the gaze point 321 is located at a display (such as the display 305), then the distance 333 may for example be measured between the gaze point 321 and the point where the gaze ray 330 reaches the display 305.

The training 602 comprises forming 702 a consistency measure based on at least a gaze ray 340 predicted by the gaze tracking model 401 using the image captured at the point in time by the first imaging device 302 and a gaze ray 350 predicted by the gaze tracking model 401 using the image captured at the point in time by the second imaging device 303. The consistency measure may be employed as a way to measure how similar the predicted gaze rays 340 and 350 are to each other. Examples of the consistency measure will be described further below.

The training 602 comprises forming 703 an objective function based on at least the formed distance 333 and the consistency measure. The objective function may for example be referred to as an evaluation function, or an assessment function. The objective function may for example be a loss function or a cost function. Examples of the objective function will be described further below.

The training 602 comprises training 704 the gaze tracking model 401 using the objective function. Training 704 the gaze tracking model 401 may for example comprise setting one or more parameters of the gaze tracking model 401. A machine learning algorithm may for example be employed to train 704 the gaze tracking model 401. A neural network may for example be employed to train 704 the gaze tracking model 401. A convolutional neural network may for example be employed to train 704 the gaze tracking model 401.

The objective function employed in the method 600 may be expressed in different ways. Let $p_0$ denote the gaze point 321 indicated by the gaze data obtained at step 601. Let $r_1$ denote the gaze ray 330 predicted for the first image obtained at the step 601. Let $p(r_i)$ denote the gaze point 331 provided by the gaze ray $r_1$ at the display 305. In other words, $p(r_i)$ is the point 331 where the predicted gaze ray $r_i$ reaches the display 305. Let $r_2$ and $r_3$ be the gaze rays 340 and 350 predicted for the images captured by the first and second imaging devices at the point in time. The objective function L may then be expressed as $$L = f_1(|p_0 - p(r_1)|) + f_2(r_2, r_3) \qquad (1)$$

where $f_1$ is a function of the distance between the gaze point $p_0$ and the predicted gaze point $p(r_1)$, and $f_2$ is the consistency measure which may be regarded as a function of the predicted gaze rays $r_2$ and $r_3$. The objective function L in equation 1 assumes a value in the form of a real number. The value of the objective function depends on the gaze rays $r_1$, $r_2$ and $r_3$ predicted by the gaze tracking model 401.

The functions $f_1$ and $f_2$ may be selected depending on how much one would like to penalize the distance between the gaze point $p_0$ and the predicted gaze point $p(r_i)$, and the deviation between the predicted gaze rays $r_2$ and $r_3$ when training the gaze tracking model 401. The function $f_1$ is typically an increasing function, such as $f_1(x)=x$ or $f_1(x)=x^2$, but other functions could also be envisaged. The function $f_2$ typically increases as the gaze rays $r_2$ and $r_3$ get more different from each other. The function $f_2$ may for example measure a distance between gaze origins of the gaze rays $r_2$ and $r_3$ and/or a difference between directions of the gaze rays $r_2$ and $r_3$. In other words, the consistency measure $f_2$ may for example be expressed as $$f_2(r_2, r_3) = f_3(|o(r_2) - o(r_3)|) \qquad (2)$$

where $o(r_2)$ is the gaze origin of the gaze ray $r_2$, $o(r_3)$ is the gaze origin of the gaze ray $r_3$, $f_3$ is an increasing function (such as $f_3(x)=x$ or $f_3(x)=x^2$), or as $$f_2(r_2, r_3) = f_4(\mathrm{dir}(r_2), \mathrm{dir}(r_3)) \qquad (3)$$

where $\mathrm{dir}(r_2)$ is the direction of the gaze ray $r_2$, $\mathrm{dir}(r_3)$ is the direction of the gaze ray $r_3$, and $f_4$ is a function that decreases as the directions of the gaze rays $r_2$ and $r_3$ get closer to each other. For example, $f_4$ may be a function (such as $f_4(x)=x$ or $f_4(x)=x^2$) of the angle between vectors defining the directions of the predicted gaze rays $r_2$ and $r_3$.

Equations 1-3 are expressed in the setting of the first example implementation described above in relation to step 601. In the second example implementation described above in relation to step 601, there is only need for two imaging devices and the first two gaze rays $r_1$ and $r_2$ coincide. In this setting, the objective function L from equation 1 may be expressed as $$L=f_1(|p_0-p(r_2)|)+f_2(r_2, r_3) \quad (4)$$

Since the gaze rays $r_2$ and $r_3$ are predicted based on images captured at the same point in time, both predicted gaze rays $r_2$ and $r_3$ could be compared with the gaze point $p_0$, whereby the objective function L may be expressed as $$L=f_1(|p_0-p(r_2)|)+f_1(|p_0-p(r_3)|)+f_2(r_2, r_3) \quad (5)$$

In general, the training data obtained at the step 601 may comprise more images, and more gaze data than described above. For example, a first set of K images may be received together with associated gaze points $\hat{p}_k$. The gaze points $\hat{p}_k$ may be true gaze points, or gaze points estimated in any suitable way. Gaze rays $r_k$ may be predicted based on the respective images, and gaze points $p(r_k)$ at the display 305 for these gaze rays $r_k$ may be compared with the received gaze points $\hat{p}_k$. A second set of N images may be received, and gaze rays $r_n$ may be predicted based on these images. The consistency between these gaze rays $r_n$ may be considered. Hence, the objective function L may be expressed as $$L=\Sigma_{k=1}^{K}f_1(|\hat{p}_k-p(r_k)|)+\Sigma_{n=1}^{N}\Sigma_{m=1}^{N}f_2(r_n, r_m) \quad (6)$$

where $$f_2(r_n, r_n)=0$$

for all n from 0 to N.

In the above equations 1-6, the objective function L has been expressed as a cost function or loss function which is to be minimized. In other words, during the training step 704, the gaze tracking model 401 is trained such that the gaze rays predicted by the gaze tacking system 401 provides a low value (for example in the form of a small real number) for the objective function. The training step 704 may for example strive to minimize the objective function. During the training 704, the gaze tracking model 401 may for example be modified or extended for reducing a value or size of the objective function. In an implementation where machine learning is employed to train the gaze tracking model 401, boosting may for example be employed to extend the gaze tracking model 401 for reducing a value or size of the objective function.

It will be appreciated that the function L could be multiplied by (−1) to yield an objective function that is to be maximized instead of minimized. In other words, during the training step 704, the gaze tracking model 401 may be trained such that the gaze rays predicted by the gaze tacking system 401 provides a high value (for example in the form of a large real number) for the objective function. The training step 704 may for example strive to maximize the objective function. During the training 704, the gaze tracking model 401 may for example be modified or extended for increasing a value or size of the objective function. In an implementation where machine learning is employed to train the gaze tracking model 401, boosting may for example be employed to extend the gaze tracking model 401 for increasing a value or size of the objective function.

The gaze tracking model 401 described above with reference to FIG. 4 is adapted to predict a gaze ray 402 based on an image 403 of an eye 100. The predicted gaze ray 402 may for example be expressed in a coordinate system relative to the image plane of the imaging device that captured the image. When a consistency measure is employed for gaze rays predicted for images captured by different imaging devices, the predicted gaze rays may need to be transformed into a common coordinate system before being compared. If the gaze tracking model 401 is expressed as $$r_k=h(\text{image}_k) \quad (7)$$

where k is the imaging device by which the image $\text{image}_k$ was captured, $r_k$ is the predicted gaze ray, and h is a mapping defining the gaze tracking model 401, then the consistency measure may for example be expressed as $$f_2(r_n, r_m)=\hat{f}_2(g_{n\to 0}(r_n), g_{m\to 0}(r_m)) \quad (8)$$

where the mappings $g_{n\to 0}$ and $g_{m\to 0}$ transform the gaze rays $r_n$ and $r_m$ into a common coordinate system, and $\hat{f}_2$ compares the gaze rays in the common coordinate system.

Hence, according to an embodiment, the step 702 of forming the consistency measure may comprise:

predicting a first gaze ray using the gaze tracking model 401 and the image captured at the point in time by the first imaging device, predicting a second gaze ray using the gaze tracking model 401 and the image captured at the point in time by the second imaging device, transforming the first and second gaze rays to a common coordinate system, and forming the consistency measure using the transformed first and second gaze rays.

Figure 10:
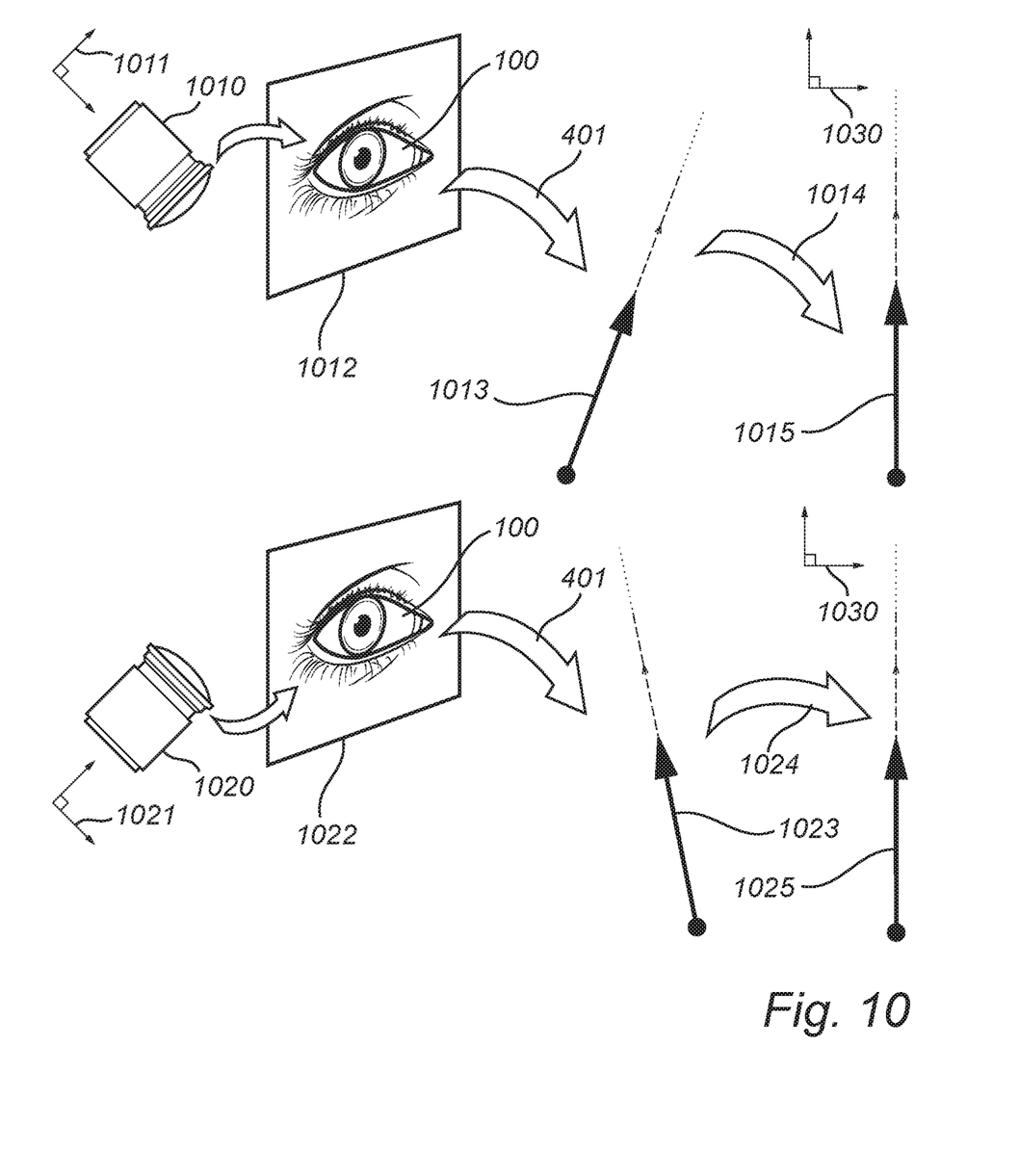
FIGS. 10-11 illustrate transformation of gaze rays between different coordinate systems.

This is illustrated in FIG. 10. A first imaging device 1010 (which may for example be the imaging device 301 in FIG. 3) has a first coordinate system 1011 relative to its image plane. The first imaging device 1010 captures an image 1012 of an eye 100, and the gaze tracking model 401 predicts a first gaze ray 1013 in the first coordinate system 1011 of the first imaging device 1010. A second imaging device 1020 (which may for example be the imaging device 302 in FIG. 3) has a second coordinate system 1021 relative to its image plane. The second imaging device 1020 captures an image 1022 of the eye 100, and the gaze tracking model 401 predicts a second gaze ray 1023 in the second coordinate system 1021 of the second imaging device 1020. In the present example implementation, the consistency measure employs a common coordinate system 1030 in which to express the predicted gaze rays to be compared. Hence, the first predicted gaze ray 1013 is transformed 1014 or converted to the common coordinate system 1030, so that a first transformed gaze ray 1015 is obtained. The transformation 1014 may for example be derived based on knowledge of how the first coordinate system 1011 is positioned relative to the common coordinate system 1030. Similarly, the second predicted gaze ray 1023 is transformed 1024 or converted to the common coordinate system 1030, so that a second transformed gaze ray 1025 is obtained. The transformation 1024 may for example be derived based on knowledge of how the second coordinate system 1021 is positioned relative to the common coordinate system 1030.

The common coordinate system 1030 may for example be a coordinate system associated with the display 305 in FIG. 3, such as a coordinate system defined relative to the display 305 and/or fixed relative to the display 305. The common coordinate system 1030 may for example be a coordinate system associated with the holding arrangement 309 in FIG. 3, such as a coordinate system defined relative to the holding arrangement 309 and/or fixed relative to the holding arrangement 309. It will be appreciated that such transformations $g_{n\to 0}$ and $g_{m\to 0}$ may for example be employed in the example consistency measures presented in equations 2-3.

The common coordinate system employed in equation 8 may for example be a coordinate system associated an imaging device m (whereby the transformation $g_{m\to 0}$ is not needed since the gaze ray $r_m$ is already expressed in the common coordinate system). Hence, according to an embodiment, the step 702 of forming the consistency measure may comprise:

predicting a first gaze ray using the gaze tracking model 401 and the image captured at the point in time by the first imaging device, transforming the first gaze ray to a coordinate system associated with the second imaging device, and forming the consistency measure using the transformed first gaze ray and a gaze ray predicted by the gaze tracking model 401 using the image captured at the point in time by the second imaging device.

Figure 11:
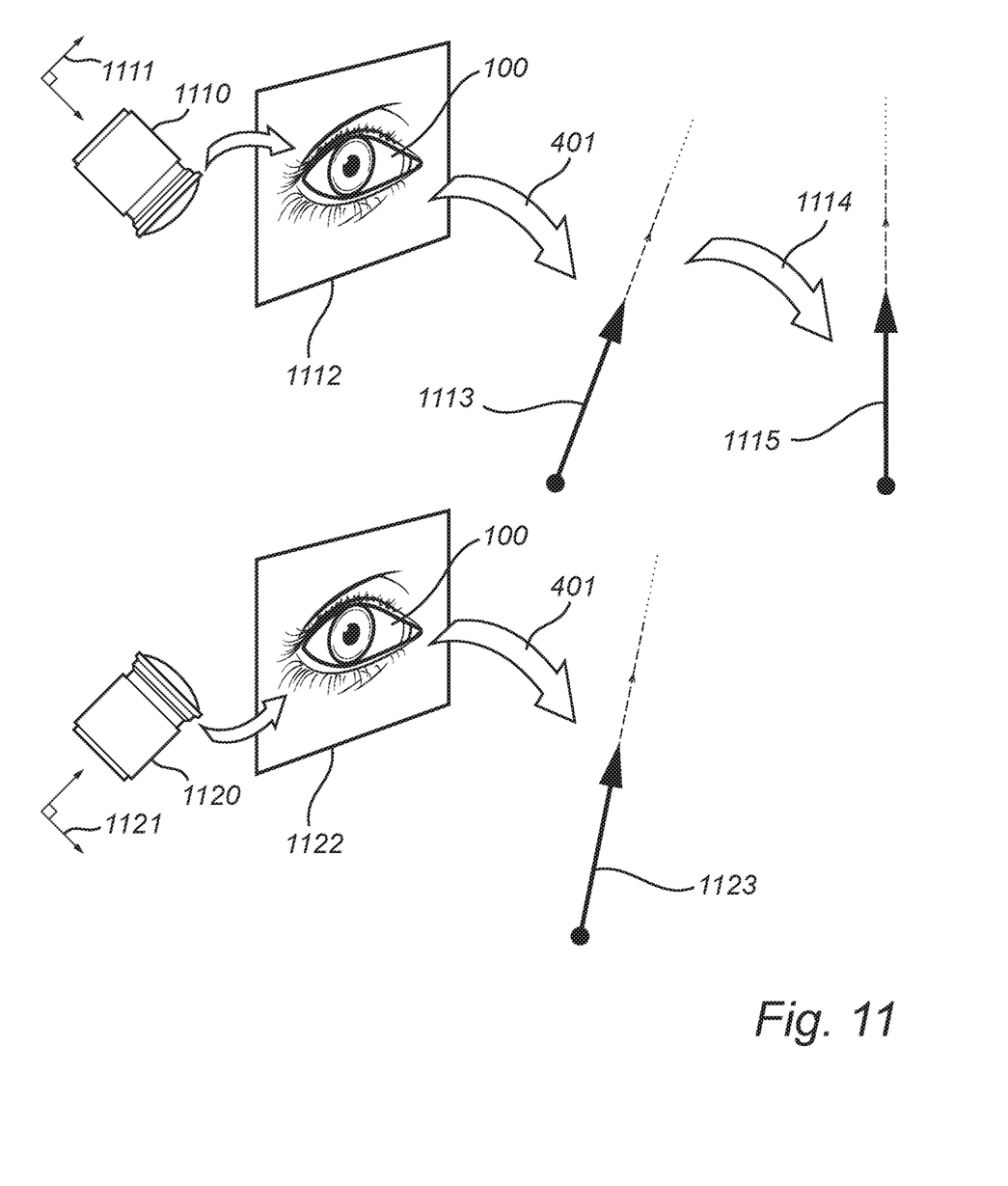

This is illustrated in FIG. 11. A first imaging device 1110 (which may for example be the imaging device 301 in FIG. 3) has a first coordinate system 1111 relative to its image plane. The first imaging device 1110 captures an image 1112 of an eye 100, and the gaze tracking model 401 predicts a first gaze ray 1113 in the first coordinate system 1111 of the first imaging device 1110. A second imaging device 1120 (which may for example be the imaging device 302 in FIG. 3) has a second coordinate system 1121 relative to its image plane. The second imaging device 1120 captures an image 1122 of the eye 100, and the gaze tracking model 401 predicts a second gaze ray 1123 in the second coordinate system 1121 of the second imaging device 1120. In the present example implementation, the consistency measure employs the second coordinate system 1121 to compare gaze rays. Hence, the first predicted gaze ray 1113 is transformed 1114 or converted to the second coordinate system 1121, so that a first transformed gaze ray 1115 is obtained. The transformation 1114 may for example be derived based on knowledge of how the first coordinate system 1111 is positioned relative to the second coordinate system 1121. The second predicted gaze ray 1123 is already expressed in the second coordinate system 1121 and therefore does not need to be transformed.

The mapping p employed for example in equations 1, 4-6 may also transform the predicted gaze rays into a common coordinate system, so that their intersection with the display 305 may be computed. Hence, the mapping p may be expressed as $$p(r_k) = \hat{p}(g_{k \to 0}(r_k)) \quad (9)$$

where $\hat{p}$ computes the intersection with the display 305 in the common coordinate system.

The gaze tracking model 401 described above with reference to FIG. 4 may for example be employed for images captured by imaging devices with different properties. The imaging devices may for example have different resolution, different focal length, different size of its field of view etc. At least some such differences could be addressed by applying a compensation function $\text{comp}_{k \to 0}$ according to the following equation:

$$r_k = h(\text{image}_k) = \tilde{h}(\text{comp}_{k \to 0}(\text{image}_k)) \quad (10)$$

The compensation function may for example adapt the images to an expected image resolution, and/or select a certain portion of a larger image to obtain an expected image size covering an expected field of view. Once the image data has been adapted to the expected format, the function $\tilde{h}$ may predict the gaze ray.

Hence, according to an embodiment, the step 702 of forming a consistency measure may comprise compensating for a difference between properties of the first imaging device and properties of the second imaging device.

Eyes may be different for different users, and even the left and right eyes of a user may have different properties. Training the gaze tacking model 401 using images of the same eye allows the gaze tracking model 401 to be particularly good at predicting gaze rays for that specific eye. Hence, in the training data obtained at step 601 of the method 600 described above with reference to FIG. 6, the eye in the first image may for example be the same eye as the eye in the images captured by the first and second imaging devices at the point in time.

If, on the other hand, the gaze tracking model 401 is trained using images of many different eyes, then the gaze tracking model 401 may be able to perform well also for other eyes than those specific eyes involved in the training of the gaze tracking model 401. A calibration procedure may for example be performed when a new user starts to use a gaze tracking system which employs the gaze tracking model 401. Hence, in the training data obtained at step 601 of the method 600 described above with reference to FIG. 6, the eye in the first image does not necessarily need to be the same eye as the eye in the images captured by the first and second imaging devices at the point in time.

According to an embodiment, the reference gaze data obtained at the step 601 of the method 600 described above with reference to FIG. 6 indicates a known reference point towards which the eye was gazing when the first image was captured. The user may for example have been prompted to look at the known reference point while the first image was captured. In other words, the indicated gaze point 321 (see FIG. 3) may be a true gaze point of the eye 100. However, embodiments may also be envisaged in which the indicated gaze point 321 is not a true gaze point. The indicated gaze point 321 may for example be a gaze point which has been estimated in some other suitable way, and may be employed for training the gaze tracking model, 401.

According to an embodiment, the consistency measure formed at the step 702 described above with reference to FIG. 7 indicates a degree of consistency between gaze rays predicted by the gaze tracking model 401 using images captured by at least the first and second imaging devices. As indicated in equation 6, further gaze rays may for example also be included in the consistency measure.

According to an embodiment, the training data obtained at step 601 may include images captured by imaging devices from different angles at the same point in time. More specifically, the gaze rays compared by the consistency measure at step 702 may be predicted by the gaze tracking model 401 using images captured from different angles at the same point in time. In the example setup depicted in FIG. 3, the first imaging device 301 captures images of the eye 100 from a different angle than the second imaging device 302, since the imaging devices 301 and 302 are located at different positions relative to the eye 100. The effect of employing the consistency measure as part of the objective function at steps 703-704 may be relatively small if the two or more imaging devices employed for the consistency measure are located very close to each other so that they view the eye 100 from more or less the same direction/angle. If, on the other hand, the consistency measure employs imaging devices distributed further apart (for example like the imaging devices 301-304 shown in FIG. 3), then the effect of employing the consistency measure as part of the objective function at steps 703-704 may be larger. The consistency measure may for example employ a gaze ray predicted based on an image captured by a first imaging device facing/viewing the eye 100 from a first direction and a gaze ray predicted based on an image captured by a second imaging device facing/viewing the eye 100 from a second direction. The first and second directions may for example be separated by an angle of at least 10 degrees, or at least 20 degrees, or at least 30 degrees, or at least 45 degrees, or at least 60 degrees. In an example implementation, the imaging devices employed for the consistency measure include imaging devices which are not coplanar, which have different distances to the face of the user, and which have an angle between eye and imaging device which is in the range −30 to 30 degrees in the horizontal direction and in the range −10 to 10 degrees vertically.

Figure 8:
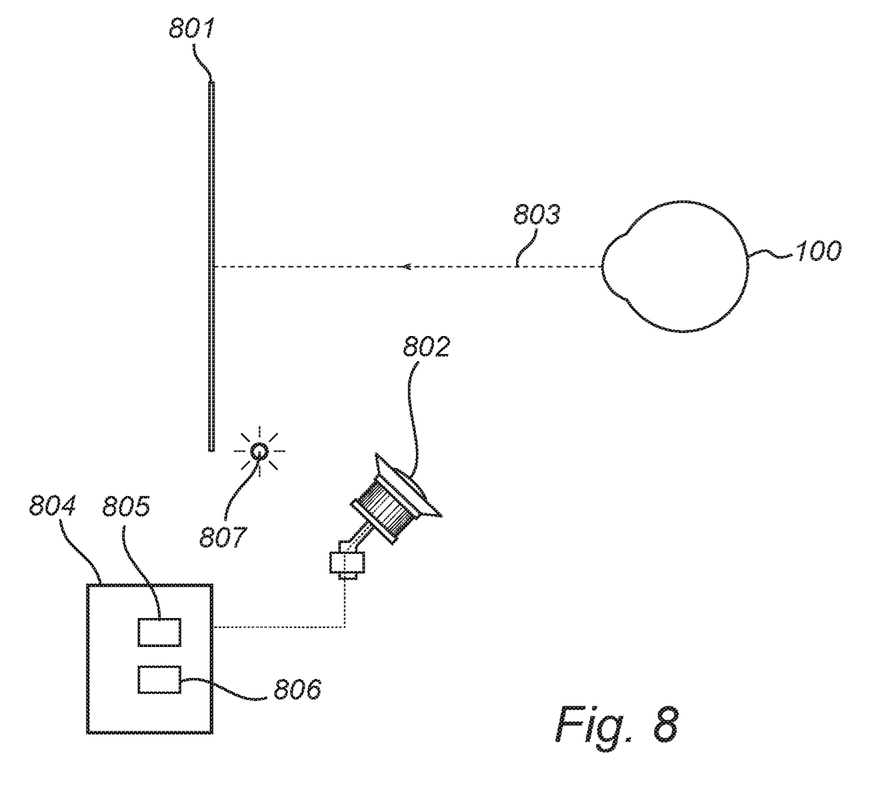
FIG. 8 illustrates how a gaze tracking model may be employed after having been trained by the gaze tracking system in FIG. 3, according to an embodiment.

FIG. 8 illustrates how a gaze tracking model 401 may be employed after having been trained by the gaze tracking system 300 in FIG. 3, according to an embodiment. The eye 100 is looking at a display 801 which may for example be the same display 305 as in FIG. 3, or a different display. An imaging device 802 (for example a camera) is arranged to capture an image of the eye 100. The imaging device 802 may for example be one of the imaging devices 301-304 in FIG. 3, or a different imaging device. The trained gaze tracking model 401 is employed to predict a gaze ray 803 based on the captured image.

Hence, according to an embodiment, the method 600 described above with reference to FIGS. 6-7 comprises the optional steps of obtaining 603 a further image of an eye 100 captured by an imaging device 802, and predicting 604 a gaze ray 803 using the further image and the trained gaze tracking model 401. In other words, the gaze tracking model 401 has been trained in a setting with multiple imaging devices 301-304, but can now be employed for performing gaze tracking with a single imaging device 802. The trained gaze tracking model 401 may for example be employed to estimate a gaze point at the display 801. It will be appreciated that the trained gaze tracking model 401 may for example be employed for gaze tracking also in cases where the eye 100 is looking at something else than a display 801, as long as the imaging device 802 is appropriately positioned relative to the eye 100 to capture images of the eye 100.

The imaging device 802 may for example have a different resolution, different focal length, different size of its field of view etc. than the imaging devices 301-304 employed for training the gaze tracking model 401. At least some such differences could be addressed by applying a compensation function to the images captured by the imaging device 802, in analogy with what is described above in connection with equation 10. According to an embodiment, the eye in the further image obtained at the step 603 is the same eye as in the images obtained at the step 601. In other words, the trained gaze tracking model 401 may be employed for the same eye as it has been trained for, which may facilitate good gaze tracking performance. However, the gaze tracking model 401 may for example be trained using images of many different eyes, so that it is able to perform gaze tracking also for other eyes than those specific eyes involved in the training of the gaze tracking model 401. A calibration procedure may for example be performed when a new user starts to use a gaze tracking system which employs the trained gaze tracking model 401.

As shown in FIG. 8, processing circuitry 804 may be communicatively connected to the imaging device 802 for receiving images from the imaging device 802. In analogy with the processing circuitry 306 in FIG. 3, the processing circuitry 804 may comprise one or more processors 805 and one or more memories 806. The processing circuitry 804 may for example perform the method steps 603 and 604. The processing circuitry 804 may for example coincide with the processing circuitry 306 in FIG. 3, whereby the processing circuitry 804 may perform all of the steps 601-604 of the method 600.

The trained gaze tacking model 401 may for example be comprised in the processing circuitry 306 or the memory 311, and may be brought physically to the new setting in FIG. 8 where it is to be employed for gaze tracking. Alternatively, the trained gaze tacking model 401 may be stored in the form of software, and may be copied, or transferred, or downloaded into the processing circuitry 804 for use in gaze tracking.

If illuminators have been employed for providing glints during training of the gaze tracking model 401, corresponding illuminators 807 could be employed when performing gaze tracking with the trained gaze tracking model 401.

According to an embodiment, the gaze tracking model 401 is adapted to estimate a reference point of an eye 100 along the gaze ray 402 that it predicts. The reference point of the eye 100 that the gaze tracking model 401 predicts may for example be the gaze origin 404 of the predicted gaze ray 402, which should be located at the eye 100 (or in the eye 100) if the gaze ray 402 has been correctly predicted. The reference point of the eye 100 may for example be the center 108 of the eye 100, the center 105 of the cornea 104, or the pupil center 102. It will be appreciated that the reference point of the eye (or the gaze origin) estimated by the gaze tracking model 401 is a different point than the gaze point of the eye 100 which may be obtained by intersecting the predicted gaze ray with the display 305 watched by the eye 100. In the example shown in FIG. 3, estimated reference points of the eye are provided in the form of estimated gaze origins 332, 342 and 352 of the respective predicted gaze rays 330, 340 and 350. According to an embodiment, the step of forming 702 the consistency measure in the method 600 comprises forming a distance (such as the distance 380 in FIG. 3) between the reference point (such as the gaze origin 342 in FIG. 3) estimated for the image captured by the first imaging device (such as the imaging device 302 in FIG. 3) at the point in time and the reference point (such as the gaze origin 352 in FIG. 3) estimated for the image captured by the second imaging device (such as the imaging device 303 in FIG. 3) at the point in time. This is exemplified in equation 2 above, where the consistency measure is based on a difference/distance between the estimated gaze origins for the predicted gaze rays $r_2$ and $r_3$. As described above in connection with equation 6, the consistency measure may for example include evaluation of consistency between more than two predicted gaze rays. For example, the consistency measure may include the distance 360 between the estimated gaze origins 332 and 342, the distance 370 between the estimated gaze origins 332 and 352, and the distance 380 between the estimated gaze origins 342 and 352.

According to an embodiment, the gaze tracking model 401 is adapted to estimate a gaze direction of the eye for which it predicts a gaze ray 402. The estimated gaze direction corresponds to the direction of the predicted gaze ray 402, and may for example be provided in the form a vector parallel to the gaze ray 402, as exemplified by the vector 522 in FIG. 5. In the present embodiment, the step 702 of forming the consistency measure in the method 600 comprises forming a difference between the gaze direction estimated by the gaze tracking model 401 for the image captured by the first imaging device (such as the imaging device 302 in FIG. 3) at the point in time and the gaze direction estimated by the gaze tracking model for the image captured by the second imaging device (such as the imaging device 303 in FIG. 3) at the point in time. This is exemplified in equation 3 above, where the consistency measure is based on the directions of the predicted gaze rays $r_2$ and $r_3$. The difference between the directions of the predicted gaze rays may be expressed in different ways. One way is to express the difference as the angle formed between vectors defining the directions of the respective predicted gaze rays $r_2$ and $r_3$. In other words, the consistency measure may for example be based on an angle formed between vectors defining the directions of the respective predicted gaze rays $r_2$ and $r_3$. Reasonable angles between predicted gaze rays may for example be 0-2 degrees once the gaze tracking model 401 has been properly trained.

Figure 9:
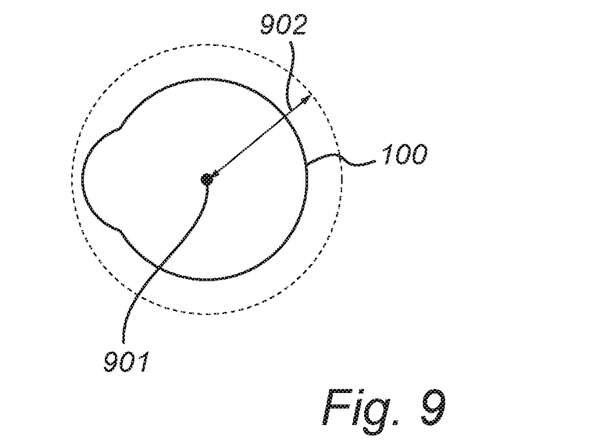
FIG. 9 shows a way to restrain a gaze tracking model during training of the gaze tracking model, according to an embodiment.

FIG. 9 shows a way to restrain the gaze tracking model 401 during training of the gaze tracking model 401, according to an embodiment. FIG. 9 shows the eye 100, the center 901 of the eye 100 and a distance 902 from the center 901 of the eye 100. A true gaze ray begins at the eye 100. Depending on preference, one might say that the gaze ray begins at the fovea 110 (se FIG. 2), at the eye ball center 108, at the cornea center 105 or at the pupil center 103. Nevertheless, a gaze ray predicted by the gaze tracking model 401 should pass through a portion of the eye 100, or at least quite close to the eye 100. During training of the gaze tracking model 401, one may therefore require that the gaze rays predicted by the gaze tracking model 401 pass within a certain distance 902 from the center 901 of the eye 100.

Hence, according to an embodiment, the method 600 comprises estimating a position 901 of the eye based on at least the images captured at the point in time by the first and second imaging devices. The position 901 of the eye 100 may for example be estimated via triangulation or via a PCCR-based gaze tracking method. In the present embodiment, the gaze tracking model 401 is adapted to estimate a reference point (or gaze origin) of the eye 100 along the gaze ray predicted by the gaze tracking model 401. In the present embodiment, the step 602 of training of the gaze tracking model 401 is performed subject to a condition that the estimated reference point (or gaze origin) should be (or are required to be) within a certain distance 902 from the estimated position 901 of the eye 100. The distance 902 may for example be the radius of the eye 100, so that the predicted gaze ray is forced to intersect the eye 100, whereby unrealistic gaze rays such as the gaze ray 330 in FIG. 3 are not provided by the gaze tracking model 401. The distance 902 may for example be slightly larger than the radius of the eye 100 to allow predicted gaze rays which at least almost intersect the eye.

The methods described above with reference to FIGS. 4-9 represent a first aspect of the present disclosure. The gaze tracking system 300 described above with reference to FIG. 3 represents a second aspect of the present disclosure. The system 300 (or the processing circuitry 306 of the system 300) may for example be configured to perform the gaze tracking method of any of the embodiments of the first aspect described above. The system 300 may for example be configured to perform the method 600 described above with reference to FIGS. 6-7.

According to an embodiment, the gaze tracking system 300 comprises processing circuitry 306 configured to obtain training data and to train a gaze tracking model using the training data. The training data comprises a first image of an eye captured by an imaging device, reference gaze data indicating a gaze point towards which the eye was gazing when the first image was captured, and images of an eye captured at a point in time by first and second imaging devices, respectively. The gaze tracking model is adapted to predict a gaze ray of an eye using an image of that eye captured by an imaging device. The processing circuitry is configured to train the gaze tracking model by at least:

forming a distance between the gaze point and a gaze ray predicted by the gaze tracking model using the first image;

forming a consistency measure based on at least a gaze ray predicted by the gaze tracking model using the image captured at the point in time by the first imaging device and a gaze ray predicted by the gaze tracking model using the image captured at the point in time by the second imaging device;

forming an objective function based on at least the formed distance and the consistency measure; and training the gaze tracking model using the objective function.

As described above with reference to FIG. 3, the gaze tracking system 300 need not necessarily comprise all the elements shown in FIG. 3. For example, the gaze tracking system 300 may employ three imaging devices, rather than the four imaging devices shown in FIG. 3, and the system need not necessarily employ any illuminators 307.

It will be appreciated that the system 300 need not necessarily employ a display 305. The gaze tracking method 600 described above with reference to FIGS. 6-7 may for example be performed for other gaze points than gaze points at a display 305. Gaze point(s) employed in the method 600 may for example be gaze points at a surface towards which the user is looking.

A third aspect of the present disclosure is represented by embodiments of a non-transitory computer-readable storage medium 311 storing instructions which, when executed by the gaze tracking system 300, cause the gaze tracking system 300 to perform the method of any of the embodiments of the first aspect described above (such as the method 600 described above with reference to FIGS. 6-7).

According to an embodiment, the non-transitory computer-readable storage medium 311 stores instructions which, when executed by the gaze tracking system 300, cause the gaze tracking system 300 to obtain training data and to train a gaze tracking model using the training data. The training data comprises a first image of an eye captured by an imaging device, reference gaze data indicating a gaze point towards which the eye was gazing when the first image was captured, and images of an eye captured at a point in time by first and second imaging devices, respectively. The gaze tracking model is adapted to predict a gaze ray of an eye using an image of that eye captured by an imaging device. The training comprises:

forming a distance between the gaze point and a gaze ray predicted by the gaze tracking model using the first image;

forming a consistency measure based on at least a gaze ray predicted by the gaze tracking model using the image captured at the point in time by the first imaging device and a gaze ray predicted by the gaze tracking model using the image captured at the point in time by the second imaging device;

forming an objective function based on at least the formed distance and the consistency measure; and training the gaze tracking model using the objective function.

As described above with reference to FIG. 3, the storage medium 311 need not necessarily be comprised in the system 300.

The person skilled in the art realizes that the present invention is by no means limited to the preferred embodiments described above. On the contrary, many modifications and variations are possible within the scope of the appended claims. For example, the embodiments described above with reference to FIGS. 1-9 may be combined to form further embodiments. Further, it will be appreciated that the gaze tracking system 300 shown in FIG. 3 is merely intended as an example, and that other gaze tracking systems may also perform the methods described above with reference to FIGS. 5-6. It will also be appreciated that the method steps described with reference to FIGS. 5-6 need not necessarily be performed in the specific order shown in these figures.

It will be appreciated that the gaze rays illustrated in FIG. 3 are only shown for illustrative purposes, these example gaze rays may not necessarily be predicted by an actual gaze mapping model 410.

It will be appreciated that processing circuitry 304 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium 311 (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

The invention claimed is:

1. A gaze tracking method comprising:
   obtaining training data, wherein the training data comprises:
      a first image of an eye captured by an imaging device;
      reference gaze data indicating a gaze point towards which the eye was gazing when the first image was captured; and
      images of an eye captured at a point in time by first and second imaging devices, respectively; and
   training a gaze tracking model using the training data, wherein the gaze tracking model is adapted to predict a gaze ray of an eye using an image of that eye captured by an imaging device,
   wherein the training comprises:
      forming a distance between said gaze point and a gaze ray predicted by the gaze tracking model using said first image;
      forming a consistency measure based on at least a gaze ray predicted by the gaze tracking model using the image captured at said point in time by said first imaging device and a gaze ray predicted by the gaze tracking model using the image captured at said point in time by said second imaging device;
      forming an objective function based on at least the formed distance and the consistency measure; and
      training the gaze tracking model using the objective function.

2. The method of claim 1, wherein the imaging device by which said first image was captured is said first imaging device.

3. The method of claim 1, wherein said first image is one of the images captured at said point in time.

4. The method of claim 1, wherein the eye in said first image is the same eye as in the images captured at said point in time.

5. The method of claim 1, wherein said first image was captured while the eye in said first image was gazing towards a known reference point, and wherein the reference gaze data indicates the known reference point.

6. The method of claim 1, wherein the consistency measure indicates a degree of consistency between gaze rays predicted by the gaze tracking model using images captured by at least the first and second imaging devices.

7. The method of claim 1, further comprising:
   obtaining a further image of an eye captured by an imaging device; and
   predicting a gaze ray using the further image and the trained gaze tracking model.

8. The method of claim 7, wherein the eye in the further image is the same eye as in the images captured at said point in time.

9. The method of claim 1, wherein the gaze tracking model predicts a gaze ray in the form of at least:
   two points along the gaze ray; or
   a point along the gaze ray and a direction of the gaze ray.

10. The method of claim 1, wherein the gaze tracking model is adapted to estimate a reference point of an eye along the gaze ray, and wherein forming the consistency measure comprises:
    forming a distance between the reference point estimated for the image captured by said first imaging device at said point in time and the reference point estimated for the image captured by said second imaging device at said point in time.

11. The method of claim 1, wherein the gaze tracking model is adapted to estimate a gaze direction of an eye, and wherein forming the consistency measure comprises:
    forming a difference between the gaze direction estimated by the model for the image captured by said first imaging device at said point in time and the gaze direction estimated by the model for the image captured by said second imaging device at said point in time.

12. The method of claim 1, further comprising:
    for the eye in the images captured at said point in time, estimating a position of the eye based on at least the images captured at said point in time,
    wherein the gaze tracking model is adapted to estimate a reference point of the eye along the gaze ray wherein the training of the gaze tracking model is performed subject to a condition that the estimated reference point should be within a certain distance from the estimated position of the eye.

13. The method of claim 1, wherein forming the consistency measure comprises:
predicting a first gaze ray using the gaze tracking model and the image captured at said point in time by the first imaging device transforming the first gaze ray to a coordinate system associated with the second imaging device, and forming the consistency measure using the transformed first gaze ray and a gaze ray predicted by the gaze tracking model using the image captured at said point in time by the second imaging device; or
predicting a first gaze ray using the gaze tracking model and the image captured at said point in time by the first imaging device, predicting a second gaze ray using the gaze tracking model and the image captured at said point in time by the second imaging device transforming the first and second gaze rays to a common coordinate system, and forming the consistency measure using the transformed first and second gaze rays.

14. The method of claim 1, wherein forming the consistency measure comprises:
compensating for a difference between a property of the first imaging device and a property of the second imaging device.

15. The method of claim 1, wherein the gaze tracking model is a machine learning model.

16. The method of claim 1, wherein training the gaze tracking model using the objective function comprises:
modifying or extending the gaze tracking model for reducing a value of the objective function; or
modifying or extending the gaze tracking model for increasing a value of the objective function.

17. The method of claim 1, wherein the image captured at the point in time by the first imaging device is captured from a different angle than the image captured at the point in time by the second imaging device.

18. A gaze tracking system comprising processing circuitry configured to:
obtain training data, wherein the training data comprises:
a first image of an eye captured by an imaging device;
reference gaze data indicating a gaze point towards which the eye was gazing when the first image was captured; and
images of an eye captured at a point in time by first and second imaging devices, respectively; and
train a gaze tracking model using the training data,
wherein the gaze tracking model is adapted to predict a gaze ray of an eye using an image of that eye captured by an imaging device,
wherein the processing circuitry is configured to train the gaze tracking model by at least:
forming a distance between said gaze point and a gaze ray predicted by the gaze tracking model using said first image;
forming a consistency measure based on at least a gaze ray predicted by the gaze tracking model using the image captured at said point in time by said first imaging device and a gaze ray predicted by the gaze tracking model using the image captured at said point in time by said second imaging device;
forming an objective function based on at least the formed distance and the consistency measure; and
training the gaze tracking model using the objective function.

19. The gaze tracking system of claim 18, wherein
the gaze tracking model is adapted to estimate a reference point of an eye along the gaze ray, the processing circuitry being configured to form the consistency measure by at least:
forming a distance between the reference point estimated for the image captured by said first imaging device at said point in time and the reference point estimated for the image captured by said second imaging device at said point in time; and/or
the gaze tracking model is adapted to estimate a gaze direction of an eye, and wherein the processing circuitry is configured to form the consistency measure by at least:
forming a difference between the gaze direction estimated by the model for the image captured by said first imaging device at said point in time and the gaze direction estimated by the model for the image captured by said second imaging device at said point in time.

20. A non-transitory computer-readable storage medium storing instructions which, when executed by a gaze tracking system, cause the gaze tracking system to:
obtain training data, wherein the training data comprises:
a first image of an eye captured by an imaging device;
reference gaze data indicating a gaze point towards which the eye was gazing when the first image was captured; and
images of an eye captured at a point in time by first and second imaging devices, respectively; and
train a gaze tracking model using the training data,
wherein the gaze tracking model is adapted to predict a gaze ray of an eye using an image of that eye captured by an imaging device,
wherein the training comprises:
forming a distance between said gaze point and a gaze ray predicted by the gaze tracking model using said first image;
forming a consistency measure based on at least a gaze ray predicted by the gaze tracking model using the image captured at said point in time by said first imaging device and a gaze ray predicted by the gaze tracking model using the image captured at said point in time by said second imaging device;
forming an objective function based on at least the formed distance and the consistency measure; and
training the gaze tracking model using the objective function.

* * * * *